United States Patent [19]

Hammons et al.

[11] Patent Number: 5,082,037
[45] Date of Patent: Jan. 21, 1992

[54] TOOL SUPPORT ASSEMBLY

[75] Inventors: James L. Hammons; William H. Lane, both of Bend, Oreg.

[73] Assignee: Telandco, Inc., Tarzana, Calif.

[21] Appl. No.: 680,430

[22] Filed: Apr. 4, 1991

[51] Int. Cl.⁵ .............................................. B25H 1/00
[52] U.S. Cl. ............................ 144/286 A; 144/286 R; 248/286; 248/287
[58] Field of Search ........... 144/285 R, 286 R, 286 A, 144/287; 248/286, 287

[56] References Cited

U.S. PATENT DOCUMENTS

| | | | |
|---|---|---|---|
| 517,677 | 4/1894 | Bender | 248/286 |
| 1,018,675 | 2/1912 | Mueller et al. | 248/287 |
| 2,703,265 | 3/1955 | Wolfe | 248/287 |
| 3,730,469 | 5/1973 | Shields | 248/287 |
| 3,861,432 | 1/1975 | Rothenberger | 144/286 R |
| 4,932,620 | 6/1990 | Foy | 248/286 |
| 5,018,563 | 5/1991 | Yoder | 144/287 |

Primary Examiner—W. Donald Bray
Attorney, Agent, or Firm—Fulwider, Patton, Lee & Utecht

[57] ABSTRACT

An apparatus for mounting tools and other devices which is capable of adjustment in both the vertical and horizontal directions relative to a box receiver mounted on the bumper of a vehicle. An L-shaped support section at its one end slidingly engages and is fixed to a box receiver mounted on a vehicle bumper. At its other end, L-shaped support section slidingly engages a second support member which has a mounting plate fixed thereto. The mounting plate is provided with an number of holes or elongated slots to provide means for mounting tools, motors, vices, and the like, to provide a secure mounting platform at remote locations, such as construction sites or campgrounds.

12 Claims, 3 Drawing Sheets

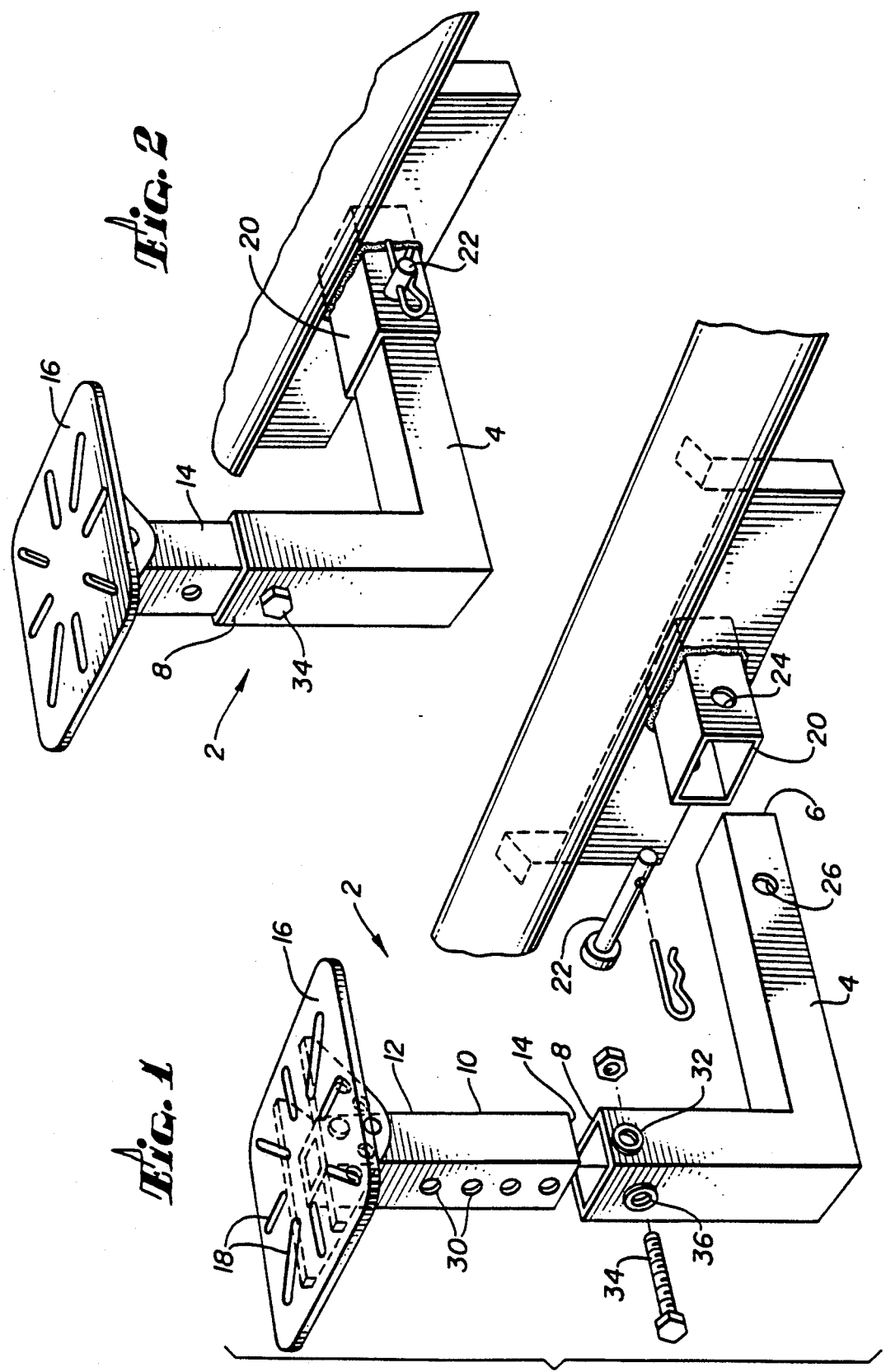

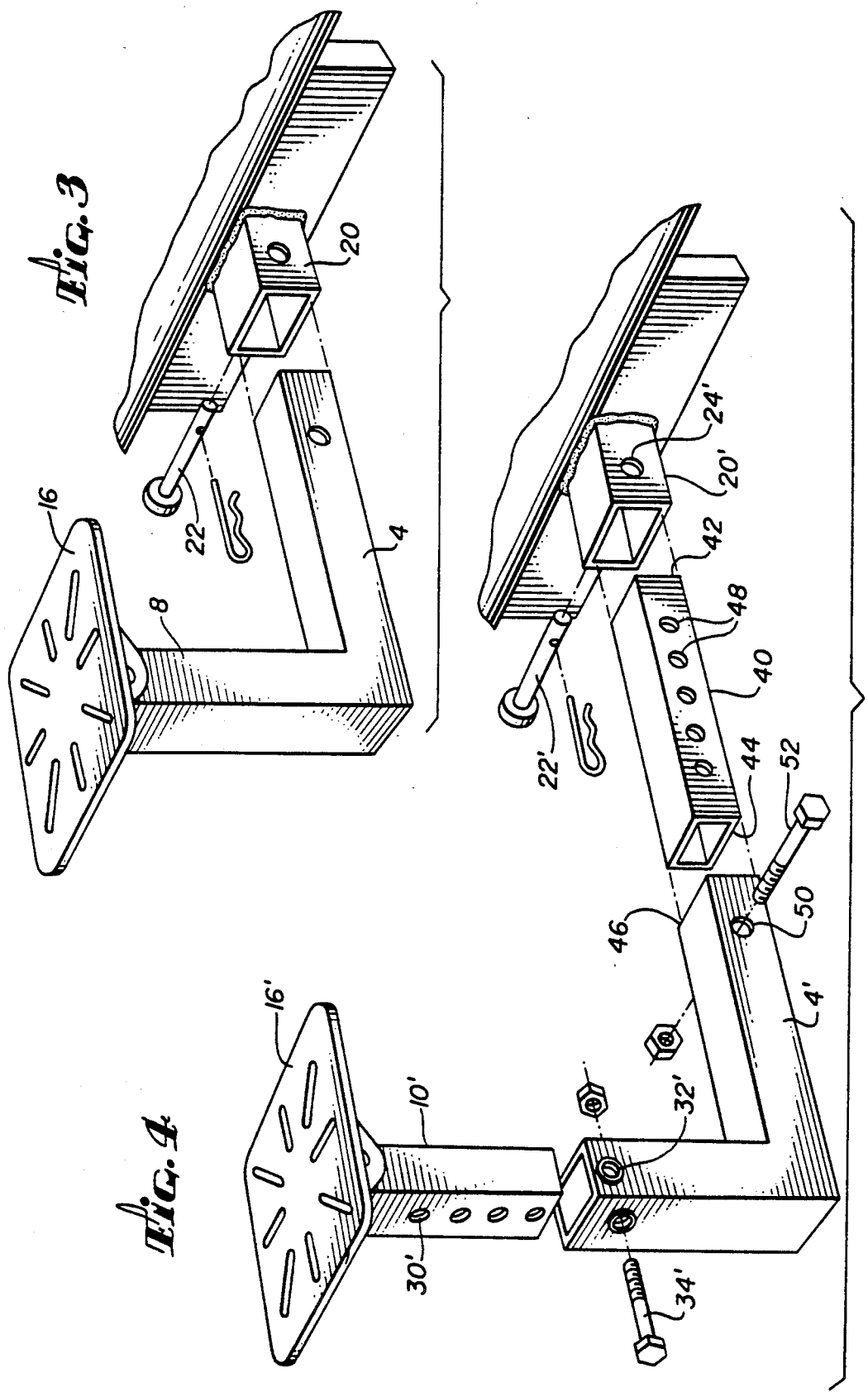

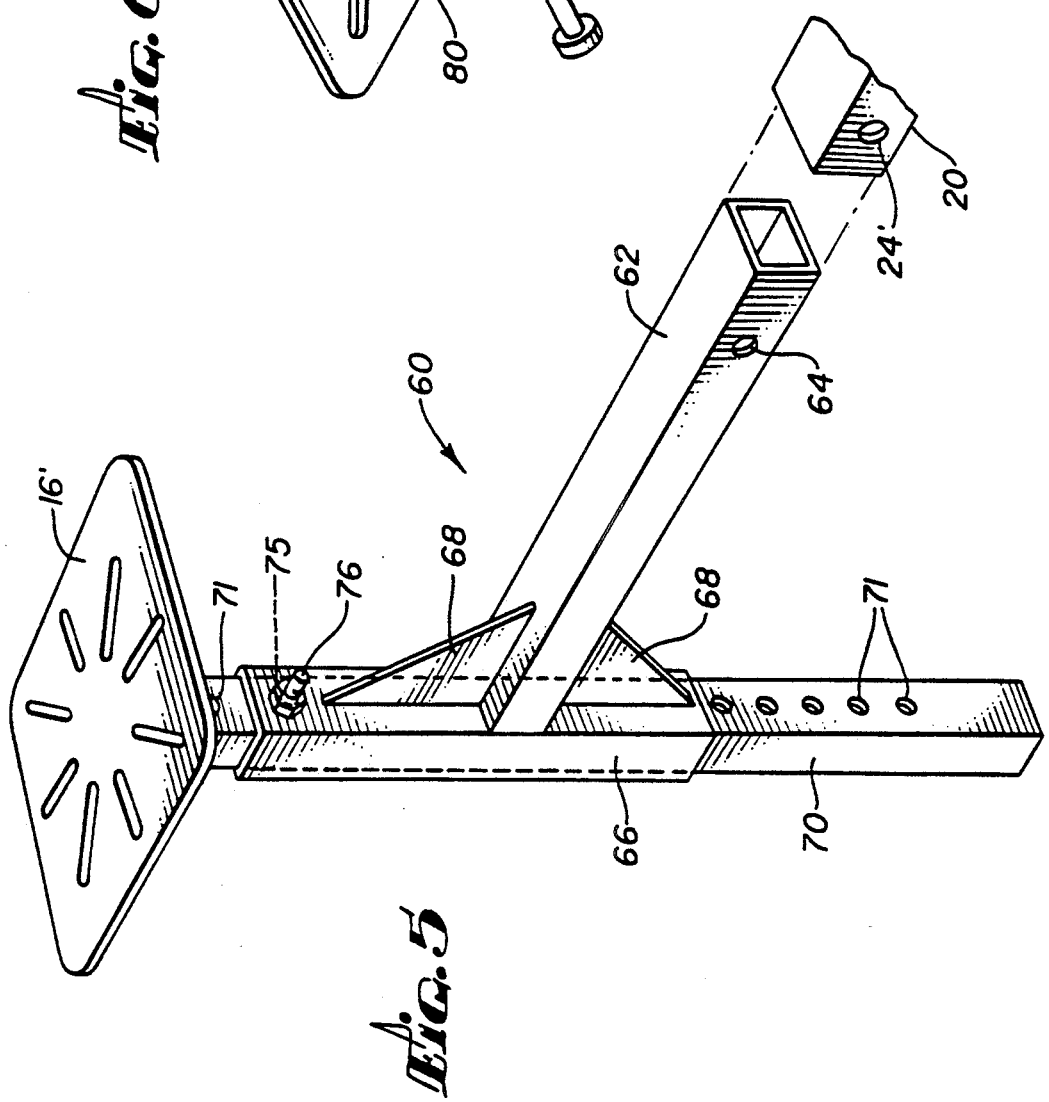

TOOL SUPPORT ASSEMBLY

BACKGROUND OF THE INVENTION

The outdoor person, either at work or recreation, is often faced with making repairs to his vehicle or articles he carries with him. All too often, the user finds himself trying to make repairs in remote locations and on an uneven, unsteady work surface. Also, it has been observed that such persons have a need for a stable work surface upon which to mount motors, power tools, vises, winches, barbecues and similar devices. It would be desirable for the user to have a stable work surface on which he could make repairs to his vehicle or do other productive work. It would also be desirable to have a work surface on which a wide variety of tools and other articles may be mounted.

One such solution to this problem is for the user to travel to a work site more suitable than the present location. However, a problem with such a solution is that the repair might be needed on the vehicle itself and the vehicle without repair is inoperable. Another problem with such a solution is the cost and time spent on traveling to a better work size. Often, need for repair arises at the most inopportune times and the better work place is not nearby.

Another such solution to this problem is a portable workbench. The workbench can be folded compactly for storage and brought out only when needed. More often than not, however, the workbench does not provide a stable work surface. The workbench would have to be very heavy in order to provide for a stable support for tools or other articles. This would pose a major problem with the portable quality of the workbench. Most often, the remote location where the repair is needed would be on an uneven ground and/or a ground having a soft surface, such as loosely packed dirt. A workbench would be unable to provide for rigid support on uneven ground, as workbenches usually have legs, unadjustable in length, for support. Also, the limited size of the workbench would make it unsteady when horizontal forces are applied. Such forces would be common when sawing or drilling.

The recreational vehicle user need not be the only one in need of making repairs at roadside or remote locations. Often, the construction worker finds himself in locations where facilities for most manual tasks, such as cutting, bending, shaping, and related activities are limited. The portable workbench presents the same problems for the construction worker as it does the recreational vehicle user, and probably even more so as the construction worker's tools are likely to be heavier and the work forces greater.

Thus, to date there is no satisfactory solution to the problem of an unsteady work surface providing accommodation for the mounting of tools and other articles being used for the repair of vehicles or other equipment in remote locations. The present invention clearly fulfills these needs.

BRIEF SUMMARY OF THE INVENTION

In general terms, the present invention provides an apparatus releaseably connected to a vehicle providing a stable work surface on which a wide variety of tools and other equipment may be mounted and may be used for the making of repairs in remote locations.

Many vehicles are equipped with a trailer hitch device known as a box receiver. The device is rectangular in shape and accepts a rectangular extension on which the trailer hitch-ball may be mounted. The trailer hitch-ball is easily removable or may not be in use at all. The "box receiver" remains attached to the vehicle permanently.

In one embodiment, the apparatus has an L-shaped section having a first end that matingly fits into the box receiver on the vehicle, thereby enabling the apparatus to be held firmly and supported by the entire weight of the vehicle attached. The L-shaped support section of the apparatus extends away from the vehicle and has a second end connected to a tiltable mounting plate having a plurality of slots. Tools or other devices as described may be attached to the mounting plate and held firmly since the entire weight of the vehicle provides support.

In another embodiment, the apparatus may be comprised of three sections slidingly connected to place the work surface at a convenient distance from the vehicle and a convenient height above the ground. The L-shaped first support section slidingly engages a second and third support section. The second support section carries the mounting plate and engages the vertical leg, while the third support section engages the box receiver and the horizontal leg of the L-shaped section.

A first L-shaped support section mates with the receiver box as described, while a second support section slidingly engages the vertical leg of the L-shaped section. The mounting plate is maintained on the top of the second support section and is thus adjustable in height as the second support section slides in the vertical leg of the L-shaped section.

In another embodiment, the plates may be removable, in order that several plates be us able, each plate having a tool or article already attached.

It is the primary object of this invention to provide a tool-mounting support assembly that can be attached directly to the box receiver on the bumper of a motor vehicle such that the entire assembly provides a rigid and fixed work surface.

It is another object of the present invention to provide a sturdy work surface in remote locations that is adjustable in height, horizontally away from the vehicle, and the work surface itself being tiltable and rotatable.

These and other objects of the present invention will become apparent from the following detailed description taken in conjunction with the accompanying drawings of illustrative embodiments.

BRIEF DESCRIPTION OF THE DRAWINGS

FIG. 1 is an exploded-elevational view of the L-shaped first support section and further depicting the mounting plate and second support section to be inserted into the vertical leg of the L-shaped support section, and the box receiver attached to the vehicle bumper;

FIG. 2 is an elevational view of the various components from FIG. 1 in their assembled state;

FIG. 3 is an elevational view of the one-piece embodiment of the mounting plate assembly;

FIG. 4 is an exploded-elevational view of the three-piece embodiment of the mounting plate assembly;

FIG. 5 is a side-elevational view of the T-shaped embodiment of the mounting plate assembly; and FIG. 6 is a partial-side view of the invention of FIG. 1 depicting the mounting plate and hole pattern for allowing the mounting plate to tilt at various angles.

DETAILED DESCRIPTION OF THE PREFERRED EMBODIMENTS

As illustrated in FIG. 1, the portable tool support assembly 2 is depicted in exploded format with the various component parts illustrated. The main support structure, L-shaped first support section 4 is preferably made of a heavy-gauge steel channel or hollow channel as depicted. The cross-sectional configuration of L-shaped section 2 is preferably either rectangular or square, but may have other cross-sectional configurations without deviating from the spirit of the invention. L-shaped first support section 2 has a pair of ends identified as first mounting means 6 and first mating means 8. A second support section 10 has a pair of ends identified as second mounting means 12 and second mating means 14. Second support section 10 is intended to slidingly engage the vertical section or L-shaped first support section 4 and to be releaseably fixed thereto. This is accomplished by the engagement of first mating means 8 with second mating means 14 in a telescoping fashion. The outside dimensions of second support section 10 should be smaller than the inside dimensions of first mating means 8 such that when the two are engaged, there is a snug fit.

A tiltable mounting plate 16 is provided for the purposes of mounting tools, vices motors, or any other device where it is desirable to have a flat, sturdy working surface in a remote location. A plurality of apertures 18 are provided on the mounting plate and may be in the form of holes, elongated slots or in any other configuration for the purpose of receiving a bolt or any fastening device such that a tool, motor, etc., can be securely fastened to mounting plate 16.

As if often the case, when a person is at a remote location, a workbench or similar device is not suitable for complete support, because it is not heavy enough for certain jobs. For this reason, tool support assembly 2 is to be securely fastened t the bumper of a motor vehicle via box receiver 20. Many recreational vehicles, pick-up trucks, and the like, are equipped with a box receiver 20 upon which a trailer hitch or other device can be mounted. According to the present invention, tool support assembly 2 is securely fastened to box receiver 20 such that the assembly is firmly held in place by the entire weight of the vehicle, thus providing a secure work surface.

To fasten the tool support assembly to the vehicle, first mounting means 6 of L-shaped support section 4 slidingly engages box receiver 20 until aperture 24 on the box receiver and aperture 26 on first mating means 8 are aligned. Locking pin 22 is inserted through the aligned apertures 24, 26, and locked in place by any suitable means, such as a spring clip or cotter pin. It is preferred that the sliding engagement between first mounting means 6 and box receiver 20 be a tight fit requiring a small amount of force to slidingly engage the two sections.

In one embodiment of the invention, it is desirable to provide a mounting plate that is adjustable in the vertical direction. To this end, tiltable mounting plate 16 is securely fixed (by means described hereafter) to second mounting means 12 of L-shaped support section 4. A plurality of apertures 30 are located along opposing sides of second support section 10 and are alignable with apertures 32 or 36 in the vertical leg of L-shaped support section 4. Second mating means 14 of second support section 10 is slidingly engagable with first mating means of L-shaped first support section 4. Apertures 30 in second mating means 14 are alignable with apertures 32 or 36 of first mating means 8. Once aligned, bolt 34 is inserted and fastened by using a thrust washer and fastening nut. As shown, mounting plate 16 is adjustable in the vertical direction, providing a convenient work surface at various heights. Apertures 32 and 36 are vertically offset from each other so that use of one or the other provides smaller increments of vertical adjustments than apertures 30 provide alone.

Turning to FIG. 2, portable tool support assembly 2 is depicted in its assembled state, wherein L-shaped first support section 4 is securely fastened to box receiver 20. Tiltable mounting plate 16 is securely fastened to L-shaped support section 4, by means of bolt 34. As described above, mounting plate 16 may be adjusted for movement in the vertical direction by removing bolt 34 and sliding second mating means 14 until other apertures in second mating means 14 are aligned with apertures on first mating means 8.

As is shown in FIG. 3, a one-piece embodiment of the portable tool assembly is depicted. In this embodiment, L-shaped first support section 4 slidingly engages box receiver 20 and is securely fastened thereto by means of bolt 22 as described. In this embodiment, mounting plate 16 is fastened directly to first mating means 8 of L-shaped support section 4. In the one-piece version, the mounting plate is not adjustable in the vertical direction, however it is still tiltable as hereinafter described.

In another embodiment of the invention, a three-piece version of the invention permits the mounting plate to be adjustable in height as well as horizontally away from the support vehicle. As shown in FIG. 4 (prime numbers are used for common numbers for common components from FIG. 1), L-shaped first support section 4' engages second support section 10' as described so that mounting plate 16' may be adjusted in the vertical direction.

To provide for adjustment in the horizontal direction, third support section 40 has a third mounting means 42 for slidingly engaging box receiver 20'. At its other end, third support section 40 has a third mating means 44 which slidingly engages mating means 46 of L-shaped support section 4. A plurality of apertures 48 are alignable with aperture 24 of box receiver 20' and fastened securely as described. Third mating means 44 is slidingly engagable with mating means 46 of L-shaped section 4' and is securely fastened by aligning one of the apertures 48 with aperture 50 and by means of bolt 52 or other fastening device, fixing the two assemblies relative to each other. As is shown, mounting plate 16' is adjustable in the horizontal direction simply by aligning any of apertures 48 with aperture 50 and securely fastening as described. Thus, mounting plate 16' is adjustable in both the vertical and horizontal directions providing the user the opportunity to securely mount tools or motors, or the like, that have unusual sizes or shapes requiring versatility in mounting.

Turning to FIG. 5, another embodiment of the invention is shown wherein a T-shaped support section 60 provides the support structure for the mounting plate. As is shown, first support leg 62 is adapted to slidingly engage box receiver 20' as previously described. An aperture 64 in first support leg 62 aligns with aperture 24' in the box receiver and a fastening means as described is used to fix the two together. The sliding engagement between first support leg 62 and box receiver 20' should be a tight fit, yet removable with a little effort.

A second support leg 66 of T-shaped support section 60 is fixed to first support leg 62 by a known means such as welding or similar attachment means. A pair of flanges 68 may be used to add support to the T-shaped support section 60. A second support section 70 slidingly engages second support leg 66 such that there is a snug fit as previously described.

One aspect of the invention relates to the means for releaseably securing second support section 70 to second support leg 66. Apertures 71 are located along opposite sides of second support section 70 and are alignable with apertures 75 on opposite sides of second support leg 66. The second support leg and second support section are essentially clamped together when apertures 71 are aligned with apertures 75 and a nut and bolt assembly 76 is used to tighten the two structures. By clamping the second leg 66 and second support section 70 in this manner, any looseness between the two sections that might create wobbling is eliminated.

A mounting plate 16 is mounted at one end of second support section 70 as previously described. As is shown in FIG. 5, mounting plate 16' is adjustable in the vertical direction, and provides a secure mounting surface due to the novel clamping method as described.

Turning to FIG. 6, mounting plate 16', as described in all of the prior embodiments, is tiltable so that the work surface may be presented at different angles. To provide for this, mounting plate 16 is fixed to a pair of flanges 80 by any known means, such as welding. Mounting plate 16' is adapted to tilt in either direction as it pivots on pin 82 which fixes flanges 80 to one of the support structures, such as second support section 10' in order to change the angle and tilt mounting plate 16', apertures in second support section 10' align with apertures 84 located in flanges 80. A locking pin or bolt is inserted to fix flanges 80 in relation to second support section 10'.

It is apparent from the foregoing that a new and improved tool mounting assembly has been provided. It will be apparent to those familiar with the art that other modifications and improvements can be made without departing from the scope of the invention as defined by the following claims.

What is claimed is:

1. An apparatus for mounting tools and other devices comprising:
   a first support section having an L-shape and having a pair of ends;
   a first mounting means at one end of the first support section and a first mating means at the other end of the first support section;
   a second support section having a pair of ends;
   a second mounting means at one end of the second support section and a second mating means at the other end of the second support section;
   means for repetitive engagement of the first and second mating sections of the first and second support sections;
   a tiltable mounting plate having a plurality of apertures for receiving tools and the like;
   adjustable mounting means for attaching the mounting plate to the second mounting means;
   whereby the first mating means slidingly engages the second mating means to provide an adjustable mounting platform that is adjustable in height and used for receiving tools or other devices.

2. The apparatus of claim 1 wherein the first mating means is an elongated hollow member and the second mating means is an elongated member having a diameter slightly less than the inside diameter of the first mating means so that when the second mating means is inserted into the first mating means there is a tight fit.

3. The apparatus of claim 2 further comprising means for removeably locking the first and second mating means to each other.

4. The apparatus of claim 3 wherein the means for removeably locking the first and second mating means has a locking pin for insertion into one of a series of alignable holes in the first and second mating means.

5. The apparatus of claim 1 wherein the first mounting means is adapted to releaseably engage a box receiver.

6. The apparatus of claim 1 wherein the mounting plate has a means for rotating and tilting in relation to the first mounting means.

7. An apparatus for mounting tools and other devices comprising:
   a support section having an L-shape and having a pair of ends;
   a first mounting means at one end of the first support section and a first mating means at the other end of the first support section;
   a tiltable mounting plate for receiving tools and the like;
   adjustable mounting means for attaching the mounting plate to the first mounting means of the first support section;
   the first mating means being adapted to slidingly engage a box receiver;
   means for removeably attaching the first mating means to the box receiver;
   whereby the L-shaped support section along with the tiltable mounting plate provides a secure work surface upon which to mount tools or other devices when working in remote locations.

8. The apparatus of claim 7 wherein the mounting plate has a means for tilting in relation to the L-shaped support section.

9. An apparatus for mounting tools and other devices comprising:
   an L-shaped first support section having a pair of ends;
   a first mounting means at one end of the L-shaped support section and a first mating means at the other end of the first support section;
   a second support section having a pair of ends;
   a second mounting means at one end of the second support section and a second mating means at the other end of the second support section;
   the first mating means of the first support section is slidingly engageable with the second mating means of the second support section, each mating means having a plurality of alignable holes for receipt of a locking pin to fix the mating sections in relation to each other;
   a tiltable mounting plate for receiving tools and the like;
   mounting means for attaching the mounting plate to the first mounting means;
   the second mounting means of the second support section is adapted to slidingly engage a box receiver;

means for releaseably securing the second mounting means of the second support section to the box receiver;

whereby the first mating means slidingly engages the second mating means to provide an adjustable mounting platform for receiving tools or other devices.

10. An apparatus for mounting tools and other devices comprising:

an L-shaped first support section having a pair of ends;

a mating means at each end of the L-shaped first support section;

a second support section having a pair of ends;

a second mounting means at one end of the second support section and a second mating means at the other end;

a third support section having a pair of ends;

a third mounting means at one end of the third support section and a third mating means at the other end;

the mating means at each end of L-shaped first support section slideably engaging the second and third mating means respectively; the mating means of the L-shaped section and the second and third mating means having alignable apertures for receiving a releasable locking pin to fix the second and third mating means to the mating means of the L-shaped support section;

a mounting plate tiltably attached to the second mounting means of second support section, the mounting plate having a plurality of apertures for receiving mounting bolts and the like for fixing tools to the mounting plate;

the third mounting means adapted to releaseably engage a box receiver so that the third support section is securely supported;

whereby the second support section is adjustable in the vertical direction and the third support section is adjustable in the horizontal direction.

11. The apparatus of claim 10 wherein the mounting plate has a flange with a plurality of apertures that are alignable with apertures in the second mounting means which receive a locking pin, the mounting plate being capable of tilting at numerous angles and fixed at an angle relative to the second mounting means.

12. An apparatus for mounting tools and other devices comprising:

a first support section having a T-shape and having a first support leg and a second support leg in the form of a T-shape;

a box receiver adapted to slidingly engage said first support leg of the T-shaped support section;

a second support section adapted for sliding engagement with the second support leg of the T-shaped support section;

the second support section having a plurality of apertures positioned to be alignable with apertures in second support leg;

means for releaseably securing the second support section to the second support leg;

a mounting plate securely fastened to one end of the second support section;

whereby the T-shaped support section is securely fastened to the box receiver and the mounting plate is adjustable in the vertical direction by sliding second support section within second support leg, thereby permitting the mounting plate to be adjustable in the vertical direction.

* * * * *